(12) United States Patent
Koshimizu et al.

(10) Patent No.: US 11,445,420 B2
(45) Date of Patent: Sep. 13, 2022

(54) USER DEVICE, RADIO COMMUNICATION SYSTEM, AND RADIO COMMUNICATION METHOD

(71) Applicant: NTT DOCOMO, INC., Tokyo (JP)

(72) Inventors: Takashi Koshimizu, Tokyo (JP); Riccardo Guerzoni, Munich (DE); Jari Mutikainen, Munich (DE); Irfan Ali, Istanbul (TR)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/610,354

(22) PCT Filed: May 2, 2018

(86) PCT No.: PCT/JP2018/017521
§ 371 (c)(1),
(2) Date: Nov. 1, 2019

(87) PCT Pub. No.: WO2018/203569
PCT Pub. Date: Nov. 8, 2018

(65) Prior Publication Data
US 2020/0092780 A1    Mar. 19, 2020

(30) Foreign Application Priority Data

May 2, 2017    (JP) .............................. JP2017-091727

(51) Int. Cl.
*H04W 36/14*    (2009.01)
*H04W 36/00*    (2009.01)
*H04W 88/06*    (2009.01)

(52) U.S. Cl.
CPC ....... *H04W 36/14* (2013.01); *H04W 36/0022* (2013.01); *H04W 36/0044* (2013.01); *H04W 88/06* (2013.01)

(58) Field of Classification Search
None
See application file for complete search history.

(56) References Cited

U.S. PATENT DOCUMENTS

2011/0310850 A1    12/2011    Klingenbrunn et al.
2013/0083661 A1*   4/2013    Gupta ............... H04W 28/0247
                                                    370/235

(Continued)

FOREIGN PATENT DOCUMENTS

JP    2013535157 A    9/2013
WO    2018146056 A1   8/2018

OTHER PUBLICATIONS

SA WG2 Meeting #119; S2-171503; "TS 23.502: Nx-based Handover procedure" NTT Docomo, Feb. 13-17, 2017; Dubrovnik, Croatia (4 pages).

(Continued)

*Primary Examiner* — Hong Shao
(74) *Attorney, Agent, or Firm* — Osha Bergman Watanabe & Burton LLP

(57) ABSTRACT

UE (50) includes a mapping information retaining unit (57) that retains association information in which a type of EPS bearer configured in 4G and a type of QoS flow that corresponds to the service quality and is configured in 5G are associated, and a handover executing unit (59) that acquires, by using the association information, association between the EPS bearer configured by the UE (50) and the QoS flow configured by the UE (50), and executes handover between the EPS bearer and the QoS flow associated with each other.

5 Claims, 9 Drawing Sheets

(56) References Cited

U.S. PATENT DOCUMENTS

2019/0394830 A1* 12/2019 Mildh ............... H04W 52/0258
2020/0267617 A1* 8/2020 Larsen ................ H04W 36/14
2020/0322845 A1* 10/2020 Jeong .................... H04W 28/18

OTHER PUBLICATIONS

SA WG2 Meeting #119; S2-171013; "TS 23.502: P-CR for Single Registration-based Interworking from EPS to 5GS procedure" Nokia, Feb. 13-17, 2017; Dubrovnik, Croatia (5 pages).
International Search Report issued in International Application No. PCT/JP2018/017521, dated Jul. 17, 2018 (3 pages).
Written Opinion issued in International Application No. PCT/JP2018/017521; dated Jul. 17, 2018 (3 pages).
Extended European Search Report issued in the counterpart European Patent Application No. 18794861.7, dated Jan. 7, 2020 (11 pages).
NTT DOCOMO; "TS 23.502: Clarifications to NGS to EPS Handoverflow"; SA WG2 Meeting #120, S2-172243; Busan, South Korea, Mar. 27-31, 2017 (5 pages).
Intel; "23.502: QoS mapping for 5GC-EPC interworking"; 3GPP TSG SA WG2 Meeting #120, S2-171962; Busan, South Korea, Mar. 27-31, 2017 (10 pages).
Office Action issued in Japanese Application No. 2019-515747; dated Dec. 8, 2020 (6 pages).
Office Action issued in Japanese Application No. 2019-515747, dated Jun. 1, 2021 (6 pages).
Office Action issued in the counterpart Chinese Patent Application No. 201880029247.2, dated Mar. 25, 2021 (12 pages).
SA2; "DRAFT LS on the need for EPS Bearer ID knowledge in gNBNG-RAN"; SA WG2 Meeting #120,S2-172657; Busan, Korea; Feb. 27-31, 2017 (1 page).
Ericsson; "Options for UE context translation between 5GC and EPC"; SA WG2 Meeting #120,S2-171757; Busan, Korea; Mar. 27-31, 2017 (3 page).
Office Action in counterpart Chinese Patent Application No. 201880029247.2 dated Jul. 28, 2021 (10 pages).
Office Action issued in the counterpart European Patent Application No. 18794861.7, dated Sep. 30, 2021 (4 pages).
Office Action issued in Chinese Application No. 201880029247.2; dated Jan. 18, 2022 (10 pages).

* cited by examiner

USER DEVICE, RADIO COMMUNICATION SYSTEM, AND RADIO COMMUNICATION METHOD

TECHNICAL FIELD

The present invention relates to a user device, a radio communication system, and a radio communication method capable of executing an inter-system handover.

BACKGROUND ART

3rd Generation Partnership Project (3GPP) specifies Long Term Evolution (LTE), and with an aim of further speeding, specifies LTE-Advanced (hereinafter, it is assumed that 4G includes the LTE-Advanced). Moreover, in the 3GPP, specifications of a successor system of the LTE (hereinafter, referred to as 5G) called 5G New Radio (NR) and the like are being studied.

In such 5G specifications, interworking between 4G and 5G, for example, handover of a user device (User Equipment, UE) between 4G and 5G is also included. In the inter-system handover between 4G (specifically, Evolved Packet Core (EPC)) and 5G (specifically, 5G Core (5GC)), mapping of PDN connection set in the EPC and PDU session established in the 5GC becomes necessary.

Specifically, mapping of EPS bearer relating to the PDN connection and QoS flow relating to the PDU session becomes necessary.

To address such a problem, a method in which SMF/PGW-C (Session Management Function/PDN Gateway-C plane) notifies the UE of the mapping information on the EPS bearer types and the QoS flow types via control plane (C plane) signaling when the UE executes the handover has been proposed (for example, see Non-Patent Document 1).

For example, when the UE executes handover from 4G to 5G, the EPC (specifically, Mobility Management Entity (MME)) notifies N1 SM Container that includes the mapping information to the UE by using HO command.

PRIOR ART DOCUMENT

Non-Patent Document

Non-Patent Document 1: "TS 23.502: P-CR for Single Registration-based Interworking from EPS to 5GS procedure", S2-171013, SA WG2 Meeting § 119, 3GPP, February 2017

SUMMARY OF THE INVENTION

However, notifying mapping information in which EPS bearer types and QoS flow types are mapped involves the following problems. In other words, because the mapping information is notified every time UE executes handover, the amount of signaling increases, which may cause a delay in notification. On the other hand, cases in which it is necessary to associate (define) a specific EPS bearer type with a specific QoS flow type are limited to cases such as when a new service is stipulated.

Furthermore, because N1 SM Container that includes the mapping information is notified from EPC to the UE by using the HO command, repairs (function addition) in 4G become necessary. However, from the viewpoint of 4G and 5G operators, there is an inclination to suppress investment in 4G which will be less used in the future.

The present invention has been made in view of the above circumstances. One object of the present invention is to provide a user device, a radio communication system, and a radio communication method capable of realizing a prompt handover between 4G and 5G while avoiding repairs in the existing 4G system.

A user device according to one aspect of the present invention is a user device (UE 50) that executes handover between a first radio communication system (4G) and a second radio communication system (5G). The user device includes an association information retaining unit (mapping information retaining unit 57) that retains association information in which a type of a bearer (EPS bearer) configured in the first radio communication system and a type of a flow (QoS flow) that corresponds to service quality and is configured in the second radio communication system are associated; and a handover executing unit (handover executing unit 59) that acquires, by using the association information, association between a bearer configured by the user device and a flow configured by the user device, and executes handover between the bearer and the flow associated with each other.

A radio communication system according to another aspect of the present invention is a radio communication system (radio communication system 10) that includes a first radio communication system and a second radio communication system. The radio communication system includes an association information retaining unit (mapping information retaining unit 330) that retains association information in which a type of a bearer configured in the first radio communication system and a type of a flow that corresponds to service quality and is configured in the second radio communication system are associated; and an association information management unit (mapping information management unit 340) that transmits the association information to a user device (UE 50) that executes handover between the first radio communication system and the second radio communication system.

A radio communication method according to still another aspect of the present invention is a radio communication method implemented in a radio communication system that includes a first radio communication system and a second radio communication system. The radio communication method includes retaining in which a user device retains association information in which a type of a bearer configured in the first radio communication system and a type of a flow that corresponds to service quality and is configured in the second radio communication system are associated; and executing in which the user device executes handover between the bearer and the flow associated with each other by using the association information.

MODES FOR CARRYING OUT THE INVENTION

Figure 1:
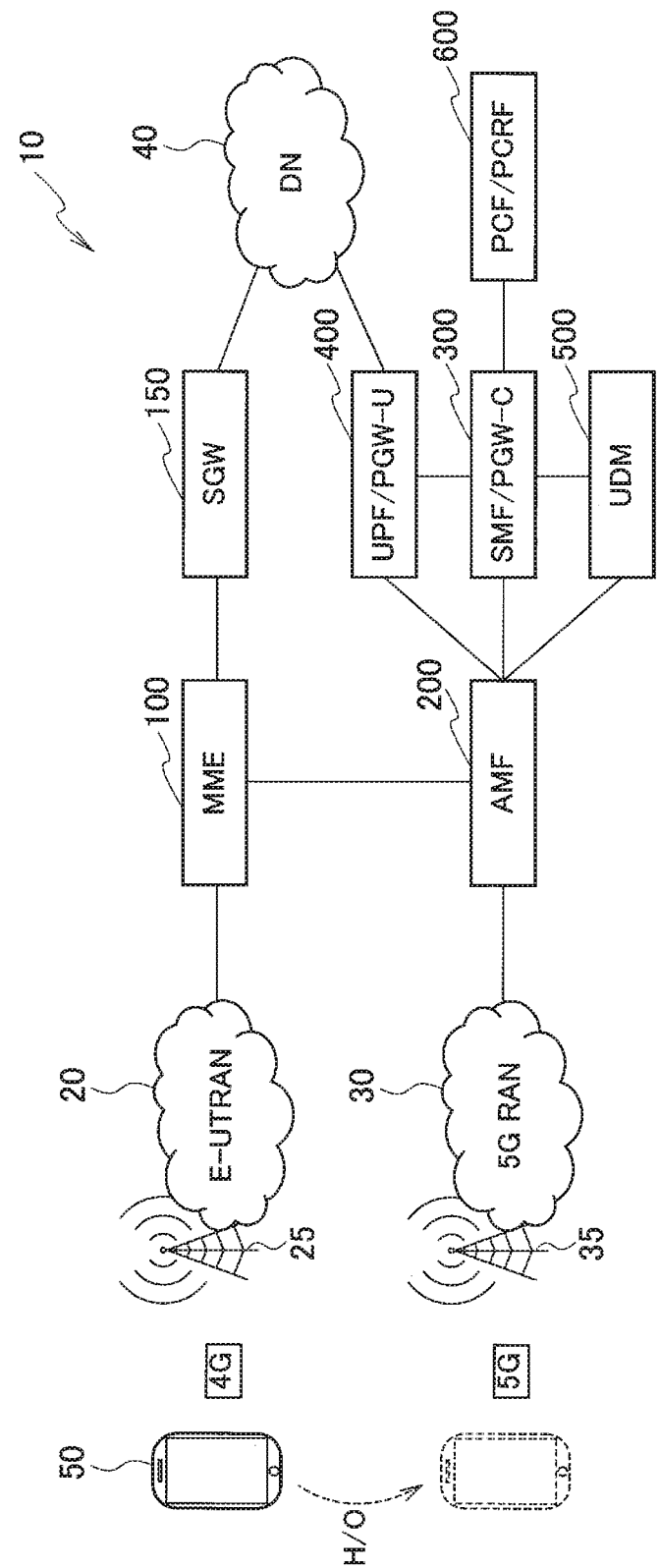
FIG. 1 is an overall structural diagram of a radio communication system 10.

Exemplary embodiments of the present invention are explained below with reference to the accompanying drawings. In the drawings, structural elements having the same function or configuration are indicated by the same or similar reference numerals and the explanation thereof is appropriately omitted.

(1) Overall Structural Configuration of Radio Communication System

FIG. 1 is an overall structural diagram of a radio communication system 10 according to the present embodiment. The radio communication system 10 supports a plurality of radio communication schemes. Specifically, the radio communication system 10 is constituted by a plurality of the radio communication systems that varies in the radio communication schemes.

More specifically, as shown in FIG. 1, the radio communication system 10 is constituted by a radio communication system (first radio communication system) in accordance with 4G and a radio communication system (second radio communication system) in accordance with 5G.

The "4G" is a radio communication system in accordance with Long Term Evolution (LTE), and includes Evolved Universal Terrestrial Radio Access Network 20 (hereinafter, "E-UTRAN 20"), Mobility Management Entity 100 (hereinafter, "MME 100"), Serving Gateway 150 (hereinafter, "SGW 150"), and the like.

The "5G" is a successor system of the LTE called New Radio (NR) and the like, and includes 5G Radio Access Network 30 (hereinafter, "5G RAN 30"), Access and Mobility Management Function 200 (hereinafter, "AMF 200"), Session Management Function/PDN Gateway-C plane 300 (hereinafter, "SMF/PGW-C 300"), User Plane Function 400 (hereinafter, "UPF/PGW-U 400"), Unified Data Management 500 (hereinafter, "UDM 500"), Policy Control Function/Policy and Charging Rules Function 600 (hereinafter, "PCF/PCRF 600"), and the like. The configuration of nodes that constitute the 5G shown in FIG. 1 is in accordance with the standards stipulated in 3GPP TS 23.501 and the like.

Data Network 40 (hereinafter, "DN 40") is connected to the SGW 150 and the UPF/PGW-U 400. An IP network such as the Internet is connected to the DN 40.

In FIG. 1, however, only the nodes (devices) relating to the present invention are shown. As it can be clearly understood from the names, the SMF/PGW-C 300, the UPF/PGW-U 400, and the PCF/PCRF 600 are explained so because it is assumed that the 4G functions (PGW-C, PGW-U, PCRF), too, would expand in the future and develop so as to function as the 5G.

Moreover, the "4G" can be referred to as the LTE (including LTE-Advanced), and the "5G" can be referred to as the New Radio (NR) and the like. Furthermore, a node group at the 4G core network side excluding the E-UTRAN 20 can be referred to as the Evolved Packet Core (EPC). A node group at the 5G core network side excluding the 5G RAN 30 can be referred to as the 5G Core (5GC).

The E-UTRAN 20 includes a radio base station 25. The radio base station 25 can be referred to as eNB (eNode B). The 5G RAN 30 includes a radio base station 35. The radio base station 35 can be referred to as gNB (gNode B).

A user device 50 (hereinafter, "UE 50") supports the 4G and the 5G. In other words, the UE 50 executes radio communication in accordance with the 4G with the radio base station 25, and executes radio communication in accordance with the 5G with the radio base station 35.

Moreover, the UE 50 performs handover between the 4G (first radio communication system) and the 5G (second radio communication system). In other words, the UE 50 can perform handover from the 4G to the 5G and from the 5G to the 4G.

Particularly, in the present embodiment, as explained later, the UE 50, the EPC, and the 5GC acquire the association between the EPS bearer and the QoS flow by using mapping information in which a bearer identifier (EPS Bearer ID) that is used for identifying EPS bearer type configured in the 4G and a flow identifier (QoS Flow ID) that is used for identifying QoS flow type configured in the 5G are associated, and execute handover between the bearer and the QoS flow associated with each other.

Note that, in the explanation, the EPS Bearer ID is appropriately abbreviated as EBI and the QoS Flow ID is appropriately abbreviated as QFI.

(2) Functional Block Configuration of Radio Communication System

A functional block configuration of the radio communication system 10 is explained below. Specifically, functional block configurations of the UE 50, and the SMF/PGW-C 300 are explained below.

(2.1) UE 50

Figure 2:
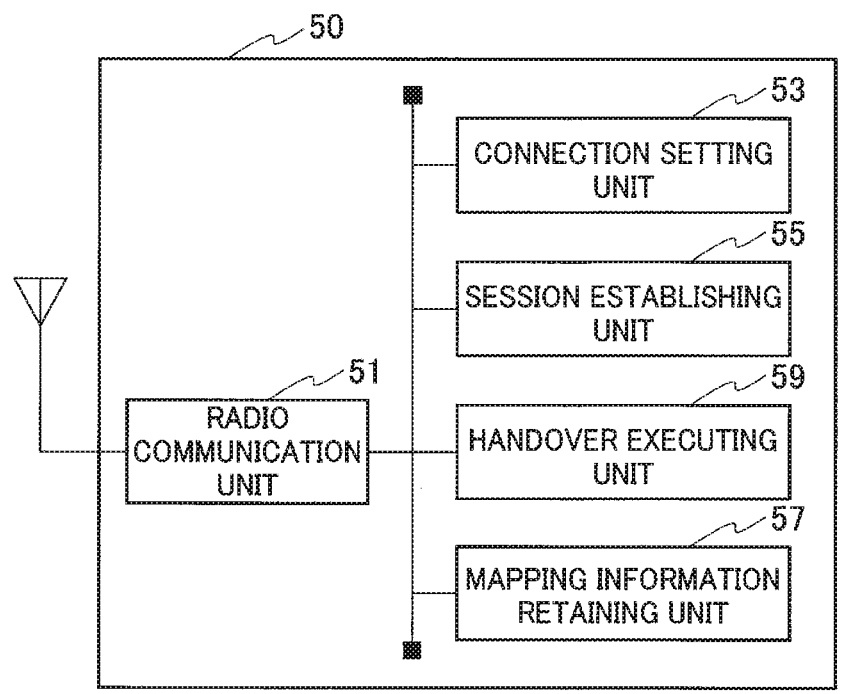
FIG. 2 is a functional block diagram of UE 50.

FIG. 2 is a functional block diagram of the UE 50. As shown in FIG. 2, the UE 50 includes a radio communication unit 51, a connection setting unit 53, a session establishing unit 55, a mapping information retaining unit 57, and a handover executing unit 59.

The radio communication unit 51 performs radio communication using 4G and 5G. Specifically, the radio communication unit 51 transmits to/receives from the radio base station 25 a radio signal using 4G. Moreover, the radio communication unit 51 transmits to/receives from the radio base station 35 a radio signal using 5G.

In the present embodiment, however, the UE 50 is not limited to any one particular type of the user device. In other words, the UE 50 can belong to an ordinary UE category or a category for Internet of Things (IoT). Specifically, the UE 50 can belong to a category (categories M1, M2) for bandwidth reduced low complexity UE (BL UE).

Furthermore, the UE 50 can be capable of performing Carrier Aggregation (CA) and Dual Connectivity (DC).

The connection setting unit 53 sets Packet Data Network connection (PDN connection) with the EPC. Specifically, the connection setting unit 53 sets PDN connection that is routed via the EPS bearer, which is a logical communication path set with the EPC. In other words, the PDN connection is related to (associated with) the EPS bearer.

The session establishing unit 55 establishes Protocol Data Unit session (PDU session) with the 5GC. Specifically, the session establishing unit 55 establishes a PDU session that indicates connection relation (association) between the UE 50 and the DN 40 that provides PDN Connectivity service.

Moreover, the PDU session is related to (associated with) the QoS flow (5G QoS Flow) stipulated in the 5GC. The QoS flow corresponds to a specific quality of service (QoS), and the communication (traffic) assigned to the QoS flow is handled in a similar manner in processes such as scheduling, queue management, shaping, and configuration of a radio link control (RLC) layer.

The mapping information retaining unit 57 retains the mapping information (association information) in which the EPS bearer types and the QoS flow (5G QoS Flow) types are mapped. As explained above, the EPS bearer is configured in 4G. Moreover, the QoS flow is configured in 5G, and is stipulated according to a specific quality of service.

The mapping information becomes necessary when handover of the UE 50 is executed between 4G and 5G (inter-system handover). In other words, when the UE 50 executes the inter-system handover, mapping between the EPS bearer relating to the PDN connection and the QoS flow relating to the PDU session becomes necessary.

The EPS Bearer ID that is used for identifying the EPS bearer type is associated with Bearer Rule that includes QoS Profile. Moreover, the QoS Flow ID (QFI) that is used for identifying the QoS flow type is associated with QoS Rule that includes the QoS Profile (see FIG. 5).

The mapping information retained by the mapping information retaining unit 57 indicates the association between such EPS Bearer IDs and QoS Flow IDs. In other words, in the mapping information, the EPS Bearer ID that is used for identifying the EPS bearer type and the QoS Flow ID that is used for identifying the QoS flow are mapped. The Bearer Rule and the QoS Rule will be further explained in detail later with reference to FIG. 5.

The mapping information retaining unit 57 can retain the mapping information transmitted from the EPC or the 5GC. In such a case, the mapping information can be transmitted to the UE 50 via, for example, a message or notification information (SIB (System Information Block)) and the like of a radio resource control layer (RRC layer).

Moreover, the mapping information can be stored beforehand in Universal Integrated Circuit Card (UICC) or Universal Subscriber Identity Module (USIM) and the like included in the UE 50. Furthermore, the mapping information can be updated at the time of updating the firmware by FOTA (Firmware On-The-Air). Alternatively, it is acceptable if the mapping information is updated at the time of updating the operating system of the UE 50.

Moreover, a range of the QoS Flow IDs that are included in the mapping information retained by the mapping information retaining unit 57 can include a range of values only used for associating with the EPS Bearer IDs. In other words, in the range of the QoS Flow IDs (for example, a range defined by numerical values or a specific character symbol), a predetermined area can be reserved by considering the extension of the association. It is acceptable if the reserved predetermined area is, for example, not used to allocate only the QoS flows in the 5GC.

The handover executing unit 59 executes the intra-system handover of the UE 50 and the inter-system handover of the UE 50. Particularly, in the present embodiment, the handover executing unit 59 executes the inter-system handover between 4G and 5G by using the mapping information retained by the mapping information retaining unit 57.

When the UE 50 executes the inter-system handover between 4G and 5G, the handover executing unit 59 acquires, by using the mapping information, the association between the EPS bearer configured by the UE 50 and the QoS flow configured by the UE 50. Furthermore, based on the acquired association, the handover executing unit 59 executes handover between the EPS bearer and the QoS flow that are associated with each other.

Specifically, the handover executing unit 59 executes handover according to the interworking procedure stipulated in Section 4.11 (System interworking procedures with EPS) of 3GPP TS 23.502.

Moreover, the handover executing unit 59 can retain the acquired association between the EPS bearer and the QoS flow after executing the handover, that is, after executing the inter-system handover between 4G and 5G till the QoS flow configured in the 5GC is released. Furthermore, the SMF/PGW-C 300, too, can retain such association till the QoS flow is released. Accordingly, even in the case of some kind of necessity, the UE 50 and the SMF/PGW-C 300 can promptly refer to the acquired association between the EPS bearer and the QoS flow.

(2.2) SMF/PGW-C 300

Figure 3:
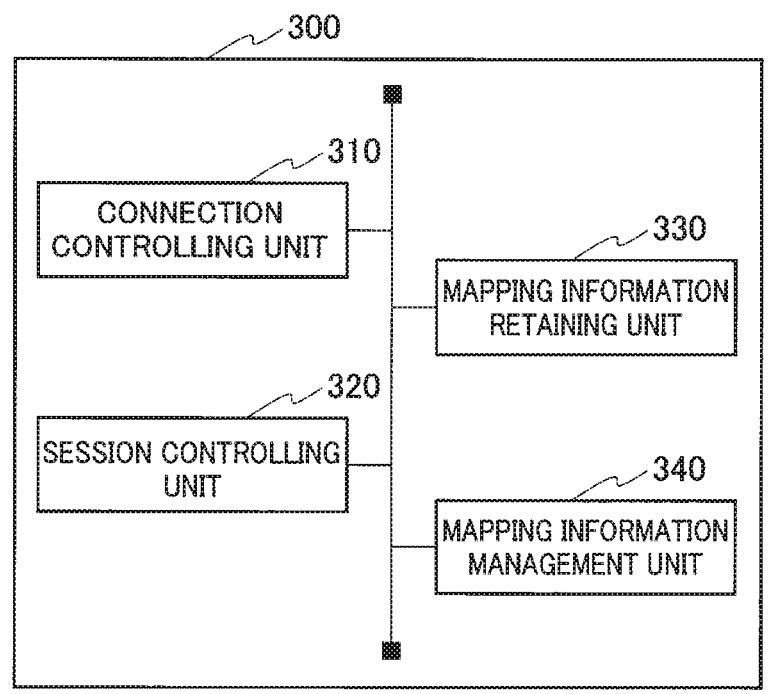
FIG. 3 is a functional block diagram of SMF/PGW-C 300.

FIG. 3 is a functional block diagram of the SMF/PGW-C 300. As shown in FIG. 3, the SMF/PGW-C 300 includes a connection controlling unit 310, a session controlling unit 320, a mapping information retaining unit 330, and a mapping information management unit 340.

The connection controlling unit 310 executes controls related to the PDN connection set with the UE 50. Specifically, the connection controlling unit 310 coordinates with other nodes (such as the MME 100 and the AMF 200) that constitute the EPC or the 5GC, and executes setting of the PDN connection/release thereof and the like.

The session controlling unit 320 executes controls related to the PDU session established with the UE 50. Specifically, the session controlling unit 320 coordinates with other nodes (such as the AMF 200) that constitute the EPC or the 5GC, and executes PDU session configuration/release thereof and the like.

The mapping information retaining unit 330 retains mapping information (association information) that is as same as that retained by the UE 50. In other words, the mapping information retaining unit 330 retains the mapping information in which the EPS bearer types and the QoS flow types are mapped.

Moreover, the mapping information retaining unit 330 can retain the mapping information that is generated or updated by the mapping information management unit 340.

The mapping information management unit 340 manages the mapping information (association information) in which the EPS bearer types and the QoS flow types are mapped. Specifically, the mapping information management unit 340 generates the mapping information based on the information provided from other nodes that constitute the EPC or the 5GC. The specific contents of the mapping, however, can be specified by an operator of the radio communication system 10, or can be generated automatically based on a predetermined algorithm.

The mapping information management unit 340 can transmit the generated mapping information to the UE 50 while causing the mapping information retaining unit 330 to retain the generated mapping information. As explained above, the mapping information can be transmitted to the UE 50 via messages or notification information of the RRC layer and the like.

Moreover, the mapping information management unit 340 can update the contents of the mapping information based on the information provided from other nodes that constitute the EPC or the 5GC. The mapping information management unit 340 causes the mapping information retaining unit 330 to retain the updated mapping information.

(3) Operation of Radio Communication System

Operation of the radio communication system 10 is explained below. Specifically, an operation in which the UE 50 executes the inter-system handover between 4G and 5G in the radio communication system 10 will be explained.

Furthermore, in the following explanation, an example of an operation in which the UE 50 executes handover from 4G to 5G will be explained.

(3.1) Overall Schematic Operation

When the UE 50 executes inter-system procedures such as handover between an idle mode or connected mode of the EPC and the 5GC, mapping between the EPS bearer relating to the PDN connection and the QoS flow relating to the PDU session becomes necessary. The UE 50 can execute the inter-system handover of the UE 50 by using the EPS bearer and the PDU session.

In the present embodiment, the UE 50 retains the mapping information in which the EPS Bearer ID that is used for identifying the EPS bearer type and the QoS flow are mapped, specifically, the mapping information that indicates the association between the EPS Bearer ID and the QoS Flow ID. Therefore, it is not necessary to transmit the mapping information, that is, the association between the EPS Bearer ID and the QoS Flow ID to the UE 50 every time the UE 50 executes the inter-system handover.

Figure 4:
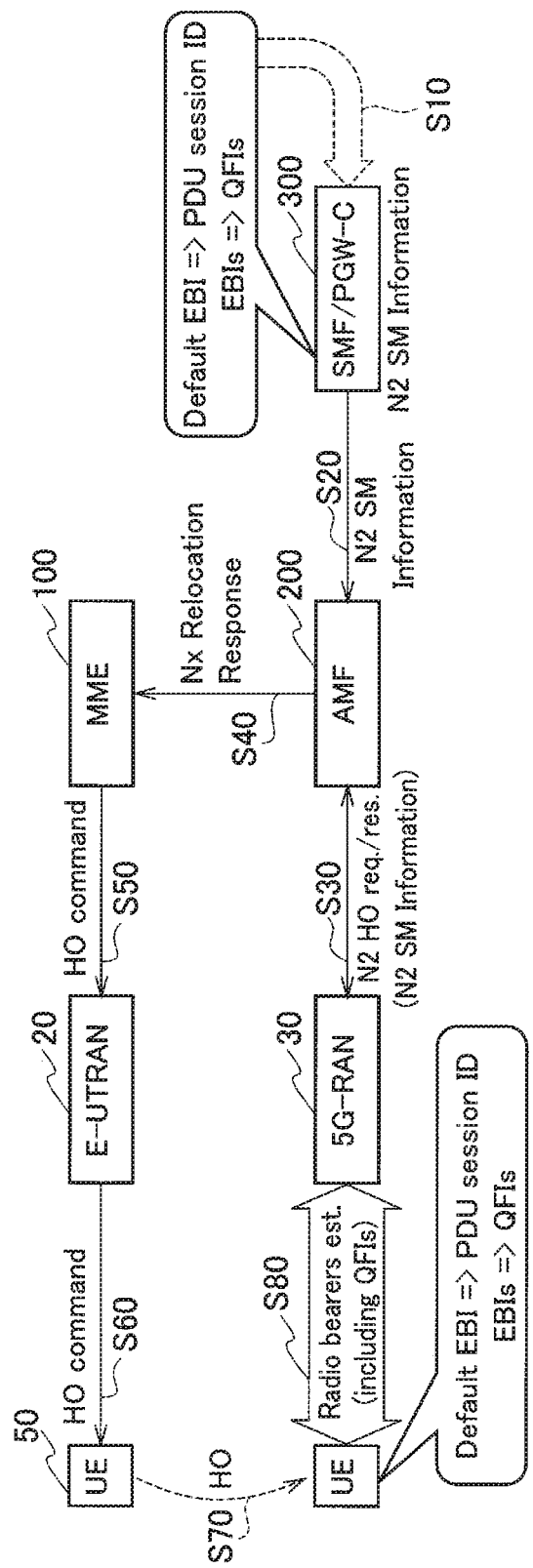
FIG. 4 is a diagram showing a schematic sequence of an inter-system handover from 4G to 5G executed by the UE 50.

FIG. 4 shows a schematic sequence of the inter-system handover from 4G to 5G executed by the UE 50. As shown in FIG. 4, the SMF/PGW-C 300 generates the mapping information based on predefined rules for associating the EPS Bearer IDs (EBIs) and the QoS Flow IDs (QFIs) (Step S10). The SMF/PGW-C 300 can generate the mapping information beforehand, regardless of the timing at which the inter-system handover of the UE 50 is executed.

As shown in FIG. 4, the mapping information is constituted by information on association between a plurality of predetermined EBIs and a plurality of predetermined QFIs (in the figure, Default EBI=>PDU session ID, and EBIs=>QFIs).

Such mapping information is provided to the UE 50 beforehand, and also retained in the UE 50. As explained above, when providing the mapping information to the UE 50, a method in which the notification information is used, or the information is pre-installed in UICC/USIM and the like can be used.

In this manner, when the UE 50 executes the inter-system handover in a state in which the mapping information is retained beforehand in the UE 50, the SMF/PGW-C 300 transmits N2 SM Information to the AMF 200 (Step S20). Processing executed from Step S20 onwards is the same as that executed in the existing sequence of the inter-system handover from 4G to 5G.

Based on the N2 SM Information received from the SMF/PGW-C 300 (Step S30), the AMF 200 transmits to/receives from the 5G RAN 30 a handover request and a response thereon (N2 HO req./res.). Moreover, the AMF 200 transmits to the MME 100 Nx Relocation Response that indicates the transition of the UE 50 from 4G to 5G (Step S40).

Upon receiving the Nx Relocation Response, the MME 100 transmits the HO command to the UE 50 via the E-UTRAN 20 (Steps S50 and S60).

The UE 50 executes handover to the 5G RAN 30 based on the received HO command (Step S70). At this step, the UE 50 judges, by using the retained mapping information, the QFI that is being configured, that is, the QFI that is associated with the EBI of the EPS bearer in an active state.

The UE 50 configures a radio bearer with the 5G RAN 30 by using the QoS flow that corresponds to the judged QFI (Step S80).

Figure 5:
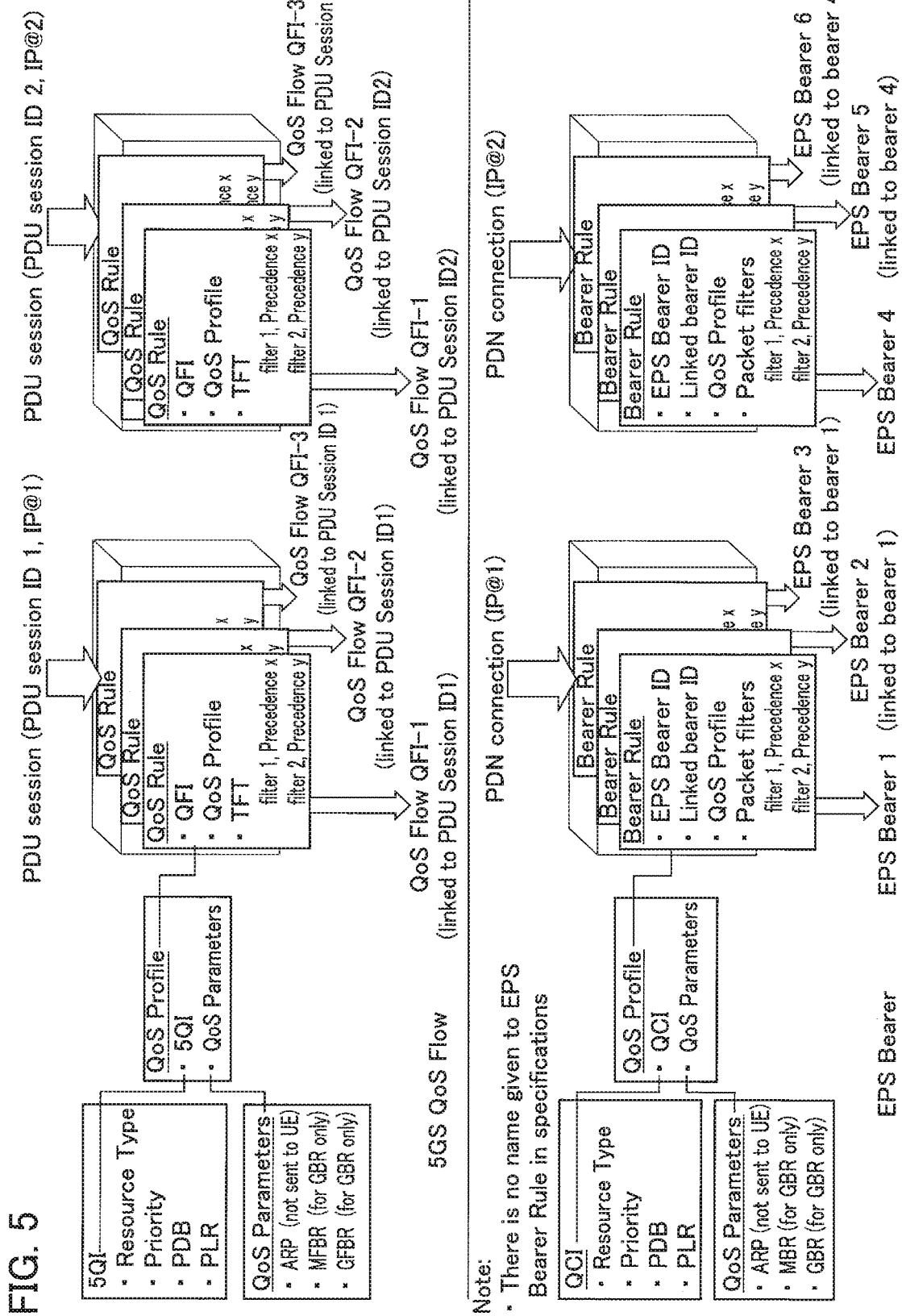
FIG. 5 is a diagram showing a configuration example of EPS bearer and QoS flow.

FIG. 5 shows a configuration example of the EPS bearer and the QoS flow. Specifically, FIG. 5 shows session parameters of the EPS bearer used in the EPC and the QoS flow used in the 5GC.

Specifically, FIG. 5 shows the quality of service (QoS) and the bearer rule sets that are required while establishing a session in the 5GC and setting a connection in the EPC, and contents thereof.

The set of QoS rules (QoS Profile) in the 5GC is used while configuring the QoS flow. The QoS flow is managed by assigning an ID (QFI) to each QoS flow.

The rule set of bearers in the EPC is also similar to that of the 5GC, and is used while setting the PDN connection. The set of bearer rules (Bearer Rules) is managed by assigning EPS Bearer ID (EBI) to each rule set.

The PDU session in the 5GC can include a plurality of the QoS flows that are identified by the QFIs. For example, it is typical that a single PDU session is established for the Internet, and a plurality of the QoS flows having different QoS depending on the applications such as real-time voice, data communication, and mail is included in the PDU session.

On the other hand, in the EPC, such a session is referred to as the PDN connection. In the PDN connection, a unique ID is not assigned, but is defined under the name of "default EPS bearer" (EPS Bearer 1 and the like). Therefore, when the plurality of different QoS flows is required in the EPC, a plurality of the EPS Bearer IDs (EBI) is prepared, and the plurality of the EBIs is linked to the default EPS bearer (EPS Bearer 1 and the like).

The EBI (for example, EPS Bearer 1 in the figure) is associated with the Bearer Rule that includes the QoS Profile. The QoS Profile includes QoS Class Identifier (QCI) and QoS Parameters.

Similarly, the QFI (for example, QFI 1 in the figure) is associated with the QoS Rule that includes the QoS Profile. The QoS Profile includes 5G QoS Indicator (5QI) and the QoS Parameters.

The mapping information is constituted by a plurality of such associations between the EBIs and the QFIs. In other words, in the mapping information, the EPS bearer types and the QoS flow types are mapped.

(3.2) Detailed Operation Example 1

Next, a concrete sequence of the inter-system handover from 4G to 5G executed by the UE 50 will be explained.

In the present operation example, a sequence of the inter-system handover that is executed when the UE 50 is in a connected mode in the 5GC will be explained.

Figure 6:
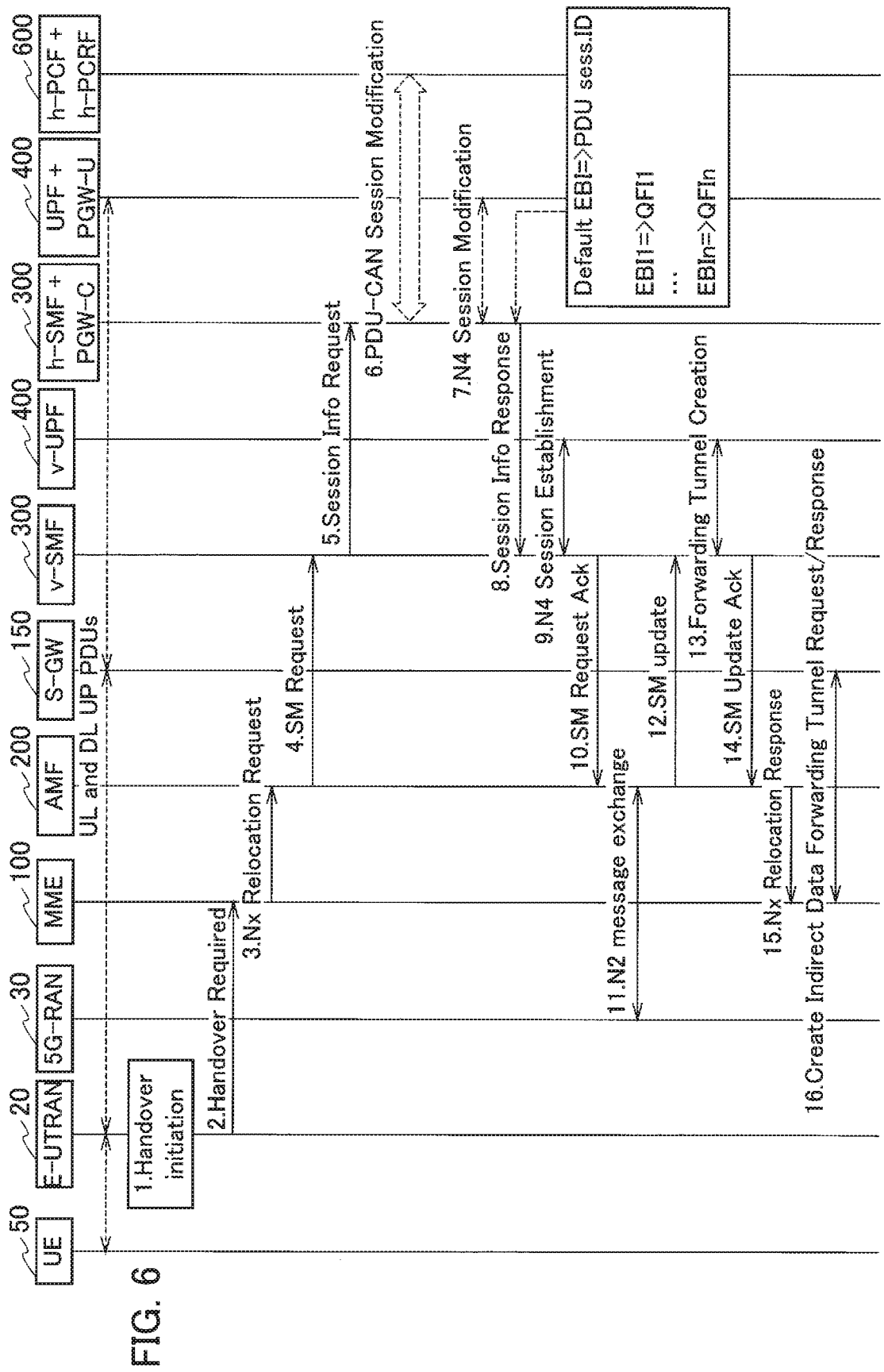
FIG. 6 is a diagram showing an example of a sequence executed in a handover initiation phase.
Figure 7:
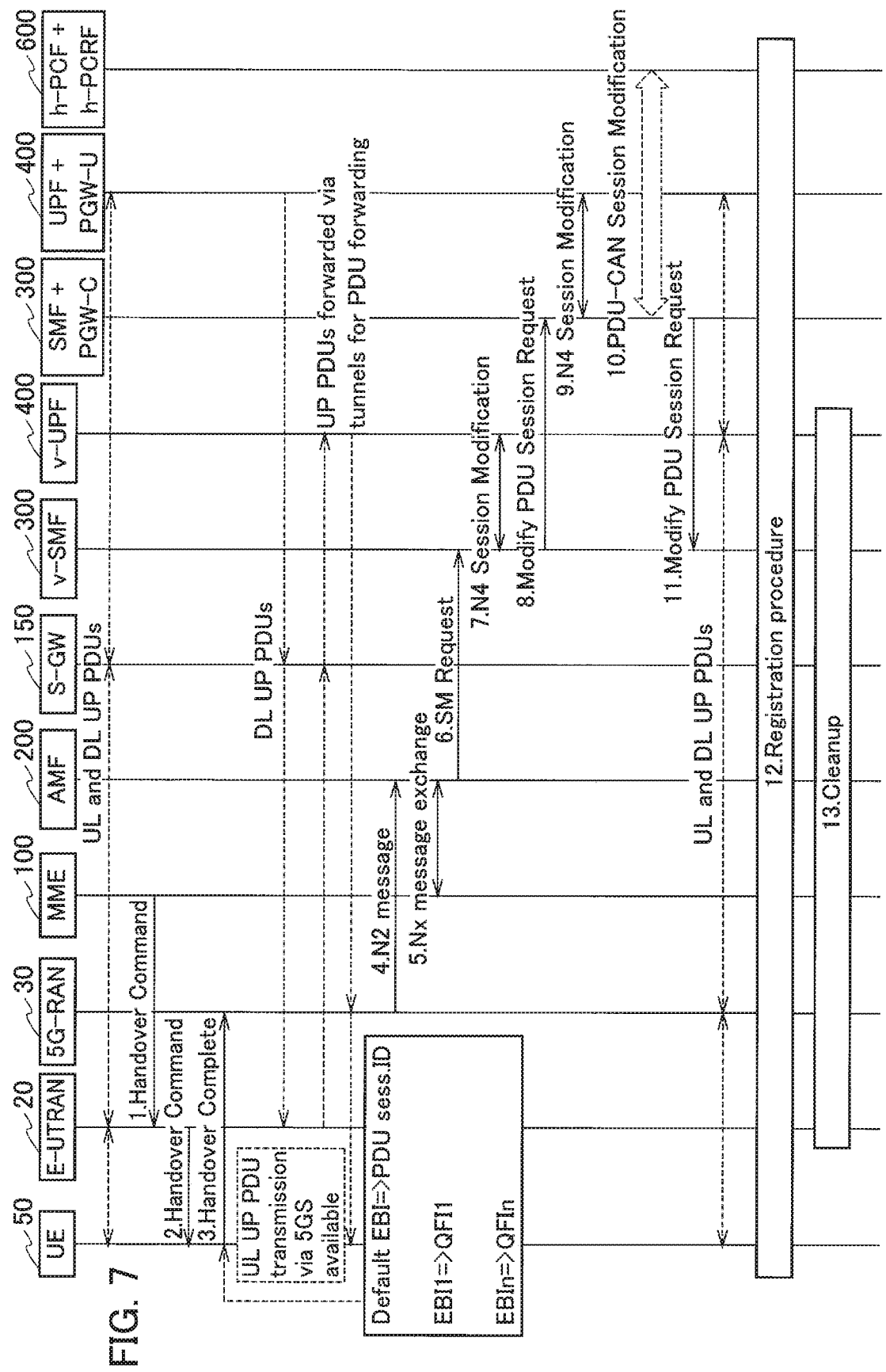
FIG. 7 is a diagram showing an example of a sequence executed in a handover execution phase.

FIG. 6 shows an example of a sequence executed in a handover initiation phase. FIG. 7 shows an example of a sequence executed in a handover execution phase.

The examples of the sequences shown in FIGS. 6 and 7 are shown in Section 4.11 (System interworking procedures with EPS) of 3GPP TS 23.502 and the like. Particularly, the examples of the sequences shown in FIGS. 6 and 7 are shown in the Prior Art Document (S2-171013) explained above. A part of the sequences that differs from that explained in Prior Art Document will be mainly explained below.

As shown in FIG. 6, in the handover initiation phase, the SMF/PGW-C 300 generates a PDU session ID and allocates thereto a predetermined QoS flow (Step 8 in FIG. 6). At this step, to allocate the predetermined QoS flow, the SMF/PGW-C 300 uses the mapping information generated beforehand.

As explained above, substantially, the PDU session ID is associated with the default EBI of the PDN connection. Moreover, the QFI is associated with any of the EBIs.

As shown in FIG. 7, in the handover execution phase, the UE 50 associates the EBIs and the QFIs by using the mapping information that is the same as that used by the SMF/PGW-C 300 (Step 3 in FIG. 7).

In this manner, in the present operation example, because the mapping information that is retained beforehand is used, the mapping information is not transmitted/received in the handover initiation phase (specifically, at Step 15) and the handover execution phase (specifically, at Steps 1 and 2).

Moreover, as explained above, the mapping information retained by the UE 50 and the SMF/PGW-C 300 can be updated, however, the mapping information updated by OAM (Operation, Administration, Management) system at the network (the EPC and the 5GC) side can be provided to the nodes of the UE 50, the SMF/PGW-C 300, and the like.

(3.3) Detailed Operation Example 2

In the present operation example, a sequence of the inter-system handover executed when the UE 50 is in an idle mode in the 5GC will be explained. Even in such a case, the mapping information explained above can be used.

Figure 8:
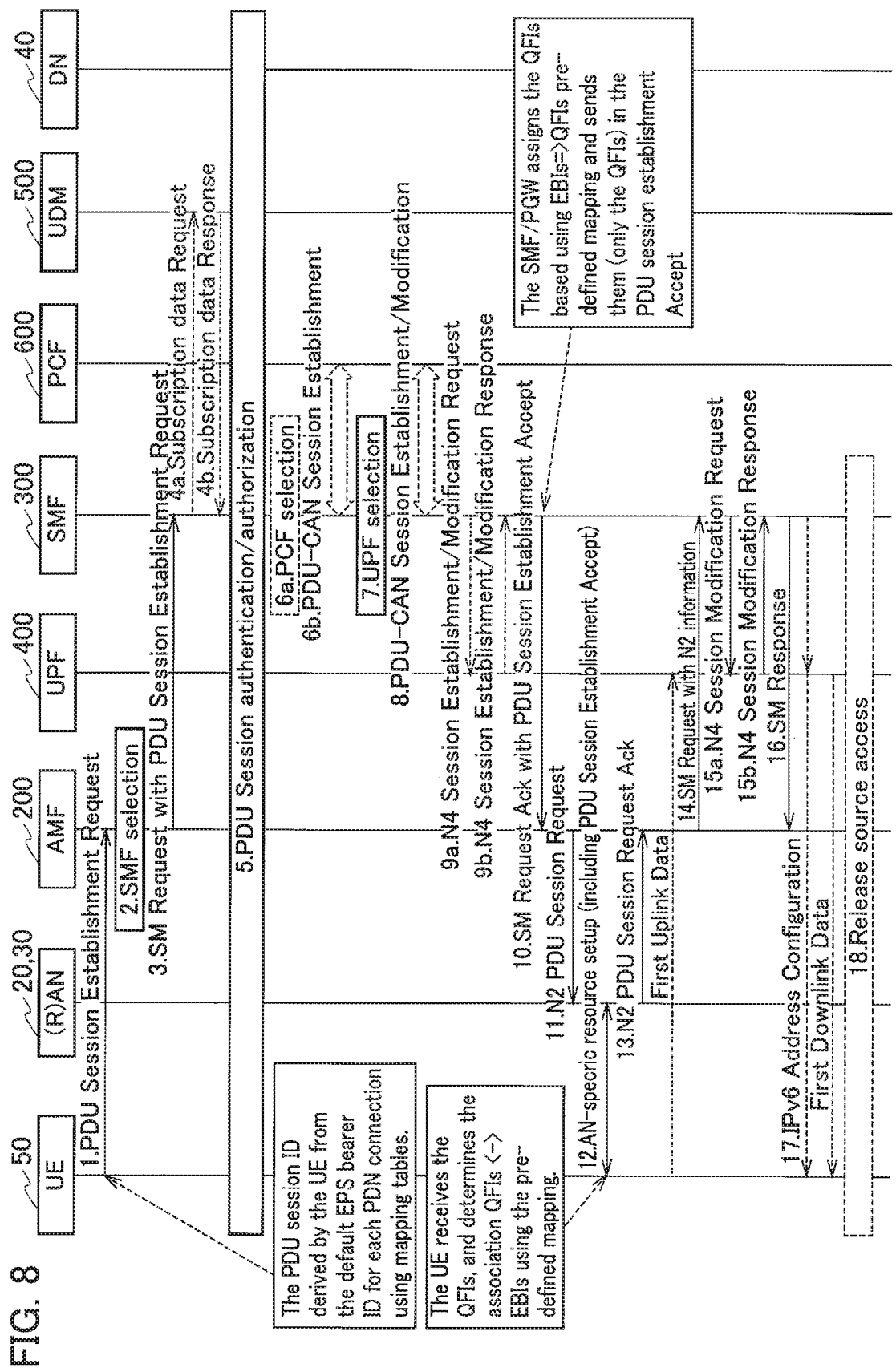
FIG. 8 is a diagram showing an example of a sequence executed when the UE 50 establishes PDU session in 5GC.

FIG. 8 shows an example of a sequence executed when the UE 50 establishes the PDU session with the 5GC. Specifically, FIG. 8 shows an example of a sequence in which first, the UE 50 is accommodated (idle mode) under the LTE/EPC, and then the PDU session is established with the 5GC when moving to the 5GC in the idle mode. In other words, there are cases in which the UE 50 establishes the PDU session with a core network (5GC) even while being in the idle state.

As shown in FIG. 8, the UE 50 executes a PDU session establishing procedure to attach to the 5GC. Furthermore, in Section 5.17.2.3 of 3GPP TS 23.501, it is explained that, in handover from 4G to 5G, the UE 50 executes a process to register on the 5GC and executes the PDU session establishing procedure to move all the PDN connections to the 5GC. A part of the PDU session establishing procedure that differs from the existing one will be mainly explained below.

The UE 50 transmits a PDU session establishing request to the AMF 200 (Step 1 in FIG. 8). At this step, because the UE 50 is originally accommodated under the EPC, the UE 50 includes the EBI of the default EPS bearer. By using the retained mapping information in the UE 50, the UE 50 derives the PDU session ID in the 5GC that is associated with the EBI of such default EPS bearer, and transmits to the AMF 200 a PDU session establishing request that includes the PDU session ID (see FIG. 5; linked with the QFI).

Moreover, by using the mapping information similar to the mapping information used by the UE 50, the SMF/PGW-C 300 acquires the QFI associated with the EBI (Step 10 in FIG. 8). The SMF/PGW-C 300 notifies the AMF 200 of only the acquired QFI via a PDU Session Establishment Accept.

The UE 50 acquires the QFI included in the PDU Session Establishment Accept (Step 12 in FIG. 8). The UE 50 determines the association between the EBI and the QFI by using the retained mapping information. Subsequently, the UE 50 establishes the PDU session with the 5GC and executes a handover.

As explained above, in the present operation example, because the SMF/PGW-C 300 notifies the AMF 200 of only the acquired QFI via the PDU Session Establishment Accept (Steps 10 to 12 in FIG. 8), the mapping information need not be notified. Accordingly, the necessary radio resources, too, are utilized efficiently.

(3.4) Mapping Model

Next, a mapping model that can be applied at the time of generating the mapping information will be explained. The mapping information explained above can be used for handover of the user device from 4G to 5G and from 5G to 4G.

In the handover from 4G to 5G, the QFI is mapped to the EBI. On the other hand, in the handover from 5G to 4G, the QFI associated with the QoS flow configured in the 5GC can be mapped randomly, that is, the QFI unique to the QoS flow can be mapped with the EBI each time the handover is executed. Alternatively, the QFI can be associated with the QoS flow at the time of generating the QoS flow, or can be associated with the QoS flow during the handover procedure.

The following two models can be considered for assigning the QFI to the QoS flow generated in the 5GC.

(3.4.1) Model 1

In the present model, the UE 50 and the 5GC (such as the SMF/PGW-C 300) perform mapping of the QFI unique to the QoS flow (native QFI) generated in the 5GC at the time of executing handover (transitioning) from 4G to 5G.

The UE 50 and the 5GC continue to retain the information on the QFI mapped in the QoS flow until that QoS flow is released. Therefore, by securing an area for the unique QFI area as the usage range of the QFI values in this manner, the association between a specific EBI and a QFI while the PDU session exists can be reused in cases such as when a handover occurs again.

(3.4.2) Model 2

In the present model, the UE 50 and the 5GC (such as the SMF/PGW-C 300) use the previously determined association between the QFI and the EBI to execute handover (transition) from 4G to 5G, and the used QFI value (or the native QFI) is released after the handover.

Specifically, when the UE 50 executes the handover from 5G to 4G and then returns to 5G, the QFI that is mapped to a specific EBI can be modified. Even in the present model, it is preferable to secure an area for such a unique QFI as the range of the QFIs.

Furthermore, because the unique QFI (native QFI) value is released after the UE 50 has executed the handover from 5G to 4G, the area can be reused for the PDU session generated in the 5GC. Moreover, when the UE 50 executes handover from 5G to 4G, the UE 50 can judge the EPS bearer to be used based on the EBI associated with the QFI.

(3.4.3) Operation Example based on Mapping Model

Figure 9:
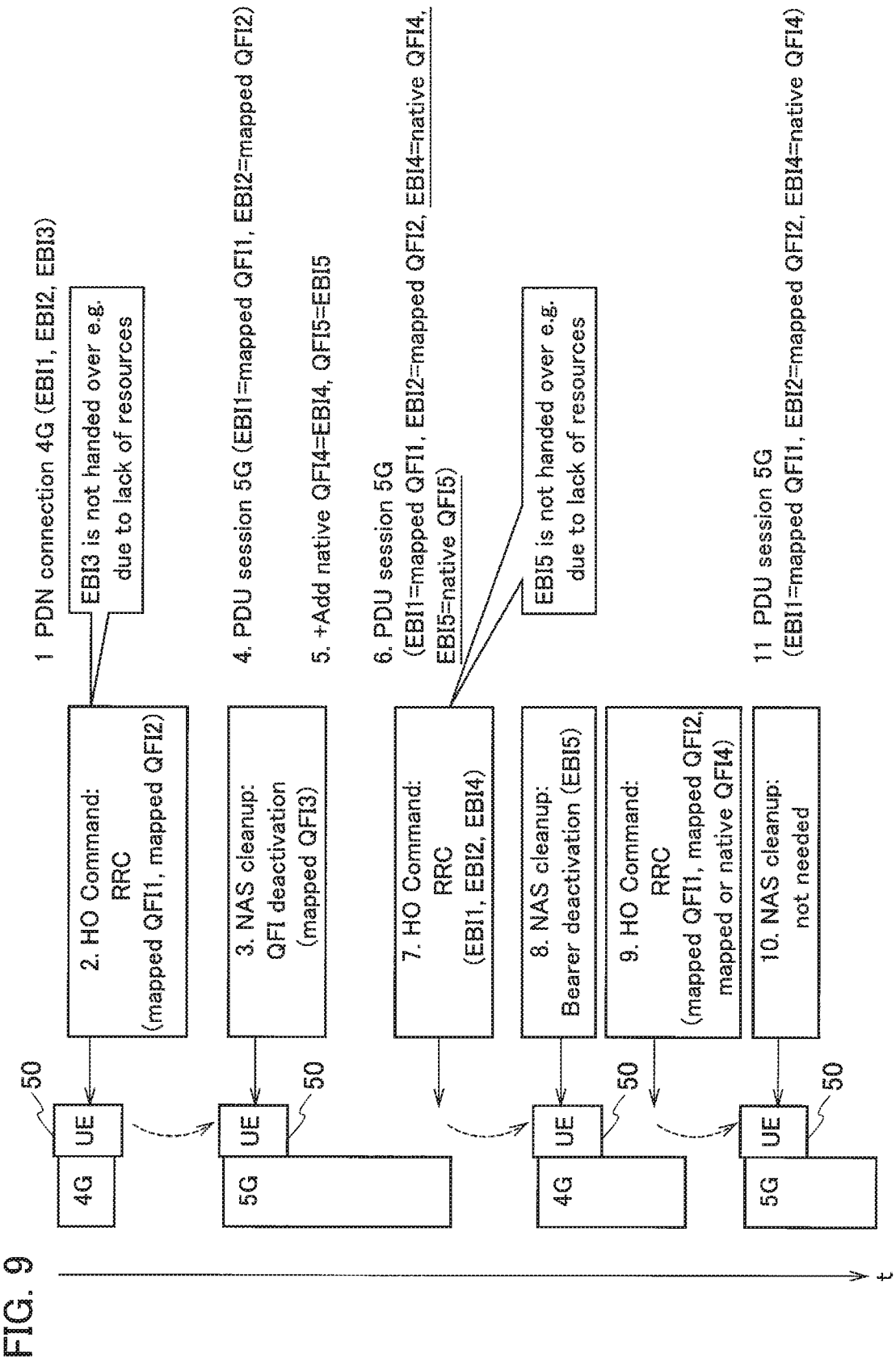
FIG. 9 is a diagram showing an example of operations performed by the UE 50 based on a mapping model.

FIG. 9 shows an example of operation performed by the UE 50 based on the mapping model explained above.

Specifically, FIG. 9 mainly shows modifications in the association between the QFI and the EBI when the UE 50 executes handover from 4G to 5G.

In FIG. 9, the EBIs EBI1 to EBI5 are examples of EPS Bearer IDs set in the EPC, and the QFIs QFI1 to QFI5 are examples of the QoS Flow IDs set in the 5GC. As shown in FIG. 9, the UE 50 that is attached to 4G sets the PDN connection, and the EBIs EBI1 to EBI3 are associated, that is, three types of the EPS bearers are configured with the PDN connection (Step 1).

Then, the UE 50 executes handover to 5G by transmitting to/receiving from (hereinafter the same) the EPC an RRC layer message and the like, and establishes the PDU session (Steps 2 to 4). Specifically, based on the retained mapping information, the UE 50 acquires the QFI1 and QFI2 that are associated with the EBI1 and EBI2. At this step, concerning EBI3, because the resources are lacking, the QoS flow corresponding to the QFI3 is not configured, and is deactivated.

Next, QFI4 and QFI5 that are unique QFIs (native QFI) to the QoS flow generated in the 5GC are added, and EBI4 and EBI5 are respectively associated with QFI4 and QFI5 (Step 5). The UE 50 reconfigures the contents of the PDU session based on the added QoS flow (Step 6).

Then, the UE 50 executes handover to 4G (Steps 7 and 8). At these steps, concerning EBI5, because the resources are lacking, the PDN connection is established based only on the association of QFI1, QFI2, and QFI4 with EBI1, EBI2, and EBI4. Therefore, the PDN connection corresponding to EBI5 cannot be established and is deactivated.

Subsequently, the UE 50 once again executes handover to 5G (Steps 9 and 10). At these steps, the UE 50 can judge that QFI4 corresponds to any of the EBIs based on the mapping information or by considering QFI4 as the native QFI. Moreover, when QFI5 exists as the mapping information or the native QFI, the QoS flow corresponding to QFI5 cannot be configured and is deactivated.

More specifically, the UE 50 can use the native QFI in the case of Model 1 explained above, and the mapped QFI in the case of Model 2. Moreover, as shown at Step 10, even if the UE 50 executes handover to 5G, deletion of Non-Access Stratum (NAS) layer is not necessary.

As a result, the UE 50 retains the association of QFI1, QFI2, and QFI4 with EBI1, EBI2, and EBI4 (QFI4 is considered as native QFI).

(4) Effects and Advantages

The following operational effects can be obtained with the embodiments explained above. Specifically, prior to the inter-system handover, the UE 50 and the SMF/PGW-C 300 retain beforehand the mapping information in which the EPS bearer types and the QoS flow types are mapped.

At the time of the inter-system handover, the UE 50 and the SMF/PGW-C 300 acquire the association between the EPS bearer (specifically, the EBI) and the QoS flow (specifically, the QFI) by using the mapping information, and execute the inter-system handover based on the acquired association.

Therefore, unlike the conventional technology, every time the UE 50 executes the inter-system handover, it is not necessary to notify the nodes that constitute the UE 50 and the 5GC (such as the AMF 200) of the mapping information by using the N1 SM Container and the like. Accordingly, the required signaling amount can be suppressed.

The method of notification in which the UE 50 is notified of the mapping information each time the UE 50 executes the inter-system handover is a simple method, however, it can cause an increase in the signaling amount and delay in notification due to the transmission/reception of the mapping information at the time of the handover.

On the other hand, in such a method, frequency at which the mapping information is required to be updated is not high, and the transmission/reception timing of the mapping information is not directly related to a timing at which the UE 50 executes the inter-system handover. Specifically, association (definition) of a specific EPS bearer type with a specific QoS flow type becomes necessary only in cases such as when a new service is specified.

In the present embodiment, while focusing on the point explained above, the mapping information is retained in the UE 50 and the SMF/PGW-C 300 beforehand without being bound to the timing at which the inter-system handover is executed.

Furthermore, according to the present embodiment, it is not necessary that the N1 SM Container that includes the mapping information is notified from the EPC to the UE 50 by using the HO command. Therefore, performing repairs (function addition) in 4G so as to notify the mapping information is unnecessary.

In the present embodiment, the range of QFIs included in the mapping information can include a range that is only used for associating with the EBIs. In other words, a predetermined area can be reserved in the range of the QFIs (for example, a range defined by a numerical value or a specific character symbol) by considering extension of the association. Accordingly, it is possible to flexibly respond to the QFI (native QFI) that is unique to the QoS flow generated in the 5GC, and the future extension.

In the present embodiment, after the inter-system handover is executed, the association between the acquired EPS bearer and the QoS flow can be retained till the QoS flow configured in the 5GC is released. Accordingly, even when some kind of necessity occurs such as reconfiguration of the QoS flows (or the EPS bearers) that could not be configured due to lack of resources, the acquired association between the EPS bearer and the QoS flow can be promptly referred.

(5) Other Embodiments

Although the contents of the present invention have been explained above by using the embodiments, it is obvious for a person skilled in the art that the present invention is not limited to those embodiments and that various modifications and improvements thereof are possible.

For example, in the embodiment explained above, the SMF/PGW-C 300 generates and retains the mapping information. However, another node (for example, the AMF 200) that constitute the 5GC, or another node (for example, the MME 100) that constitute the EPC can either generate or retain, or generate and retain the mapping information.

In the embodiment explained above, the inter-system handover from 4G to 5G has been mainly explained. However, the present invention can be similarly applied to the inter-system handover from 5G to 4G.

The block diagrams used for explaining the embodiments (FIGS. 2 and 3) show functional blocks. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 10:
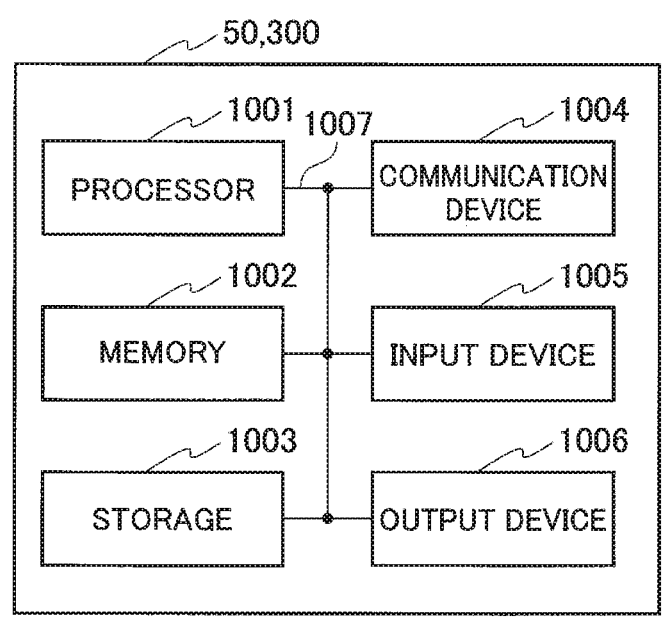
FIG. 10 is a diagram showing an example of a hardware configuration of the UE 50 and the SMF/PGW-C 300.

Furthermore, the UE 50, and the SMF/PGW-C 300 (devices) explained above can function as a computer that performs the processing of the present invention. FIG. 10 is a diagram showing an example of a hardware configuration of the devices. As shown in FIG. 10, each of the devices can be configured as a computer device including a processor 1001, a memory 1002, a storage 1003, a communication device 1004, an input device 1005, an output device 1006, and a bus 1007.

The functional blocks of the devices (see FIGS. 2 and 3) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called RRC message, and the RRC signaling can be, for example, RRC Connection Setup message, RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the SMF/PGW-C 300 can be performed by another network node (device). Moreover, functions of the SMF/PGW-C 300 can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The radio base stations 25 and 35 (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably in the present specification. The base station can also be referred to as a fixed station, NodeB, eNodeB (eNB), gNodeB (gNB), an access point, a femtocell, a small cell, and the like.

The AMF 200 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be apparent to a person skilled in the art.

INDUSTRIAL APPLICABILITY

According to the user device, the radio communication system, and the radio communication method explained above, the present invention is useful in that, it is possible to realize a prompt handover between 4G and 5G while avoiding repairs in the existing 4G system.

EXPLANATION OF REFERENCE NUMERALS 10 radio communication system
20 E-UTRAN
25 radio base station
5G RAN
35 radio base station
40 DN
50 UE
51 radio communication unit
53 connection setting unit
55 session establishing unit
57 mapping information retaining unit
59 handover executing unit
100 MME
150 SGW
200 AMF
300 SMF/PGW-C
310 connection controlling unit
320 session controlling unit
330 mapping information retaining unit
340 mapping information management unit
400 UPF/PGW-U
500 UDM
600 PCF/PCRF

The invention claimed is:

1. A terminal that executes handover between a first radio communication system, 4G, and a second radio communication system, 5G, the terminal comprising:
a memory that non-transitorily retains, before the terminal receives a handover request between a bearer and a flow, association information in which a type of the bearer configured in the first radio communication system and a type of the flow that corresponds to service quality and is configured in the second radio communication system are associated; and
a processor that executes, by using the association information, handover between the bearer and the flow associated with each other,
wherein the processor receives the association information using a PDU session Establishment/Modification procedure.

2. The terminal according to claim 1, wherein the memory retains the association information in which a bearer identifier that is used for identifying the type of the bearer and a flow identifier that is used for identifying the flow are associated, wherein
a range of the flow identifiers includes a range that is only used for associating with the bearer identifier.

3. The terminal according to claim 1, wherein the processor retains the association after the handover is executed until the flow is released.

4. A radio communication system that includes a first radio communication system, 4G and a second radio communication system, 5G, the radio communication system comprising:
a memory that non-transitorily retains, before a terminal receives a handover request between a bearer and a flow, association information in which a type of the bearer configured in the first radio communication system and a type of the flow that corresponds to service quality and is configured in the second radio communication system are associated; and
a processor that transmits the association information to a terminal that executes handover between the first radio communication system and the second radio communication system,
wherein the processor transmits the association information using a PDU session Establishment/Modification procedure.

5. A radio communication method implemented in a radio communication system that includes a first radio communication system, 4G and a second radio communication system, 5G, the radio communication method comprising:
retaining in which a terminal non-transitorily retains, before the terminal receives a handover request between a bearer and a flow, association information in which a type of the bearer configured in the first radio communication system and a type of the flow that corresponds to service quality and is configured in the second radio communication system are associated; and
executing in which the terminal executes handover between the bearer and the flow associated with each other by using the association information,
wherein the terminal receives the association information using a PDU session Establishment/Modification procedure.

* * * * *